US009150248B2

(12) United States Patent
Crisp et al.

(10) Patent No.: US 9,150,248 B2
(45) Date of Patent: Oct. 6, 2015

(54) LOWBOY TRAILER WITH STEERABLE REAR ASSEMBLY

(71) Applicant: Crisp & Crisp Inc., Robbinsville, NC (US)

(72) Inventors: Jesse L. Crisp, Robbinsville, NC (US); John K. Crisp, Robbinsville, NC (US)

(73) Assignee: Crisp & Crisp Inc., Robbinsville, NC (US)

( * ) Notice: Subject to any disclaimer, the term of this patent is extended or adjusted under 35 U.S.C. 154(b) by 0 days.

(21) Appl. No.: 13/705,626

(22) Filed: Dec. 5, 2012

(65) Prior Publication Data

US 2014/0091553 A1 Apr. 3, 2014

Related U.S. Application Data (60) Provisional application No. 61/707,010, filed on Sep. 28, 2012.

(51) Int. Cl.
| B62D 13/02 | (2006.01) |
| B62D 13/00 | (2006.01) |
| B60G 9/00 | (2006.01) |
| B60P 3/06 | (2006.01) |
| B62D 53/06 | (2006.01) |

(52) U.S. Cl.
CPC ........ B62D 13/02 (2013.01); B60G 9/00 (2013.01); B60P 3/06 (2013.01); B62D 13/00 (2013.01); B62D 13/025 (2013.01); B60G 2204/22 (2013.01); B60G 2300/044 (2013.01); B62D 53/061 (2013.01)

(58) Field of Classification Search
CPC ....................................................... B62D 13/00
USPC ............................................................ 280/426
See application file for complete search history.

(56) References Cited

U.S. PATENT DOCUMENTS

| 2,919,928 A | * | 1/1960 | Hoffer ........................ 280/81.1 |
| 3,542,390 A | | 11/1970 | Fikse |
| 4,484,758 A | * | 11/1984 | Murray et al. ................ 280/442 |
| 4,729,710 A | * | 3/1988 | Kress et al. .................... 414/421 |
| 5,402,898 A | * | 4/1995 | Lute ............................... 212/255 |

FOREIGN PATENT DOCUMENTS

| AU | 3389371 | 3/1973 |
| CH | 677646 | 6/1991 |
| FR | 1019234 | 1/1953 |
| FR | 2518950 | 7/1983 |
| GB | 964713 | 7/1964 |
| WO | 02/44005 | 6/2002 |
| WO | 2007/051250 | 5/2007 |

* cited by examiner

Primary Examiner — Joseph Rocca
Assistant Examiner — Felicia L Brittman
(74) Attorney, Agent, or Firm — Parsons Summa (57) ABSTRACT

A steerable rear assembly is disclosed for a lowboy trailer. The assembly includes a lowboy trailer deck and a neck extending partially upwardly rearward and partially horizontally rearward from the deck. A front bogey is positioned beneath the horizontally extending portion of the neck, and the front bogey is connected to the neck by a horizontal pivot between the neck and the front bogey and by a turntable between the neck and the front bogey. A rear bogey is positioned behind the front bogey and is connected to the front bogey by a vertical pivot between the front and rear bogeys.

8 Claims, 15 Drawing Sheets

FIGURE 16

LOWBOY TRAILER WITH STEERABLE REAR ASSEMBLY

BACKGROUND

In the construction industry, and specifically with respect to utility construction and utility maintenance, there is a need to mobilize heavy equipment into remote areas on narrow and curving roads. Generally larger and heavier construction equipment requires larger and heavier transportation equipment. In some cases government regulations mandate the size of the transportation equipment based upon the expected load. Many roads are inaccessible for the larger sized, longer trailers that are necessary to transport heavy construction equipment due to the tight turning radius of the narrow and curving roads that are encountered in (for example) remote locations.

Figure 16:
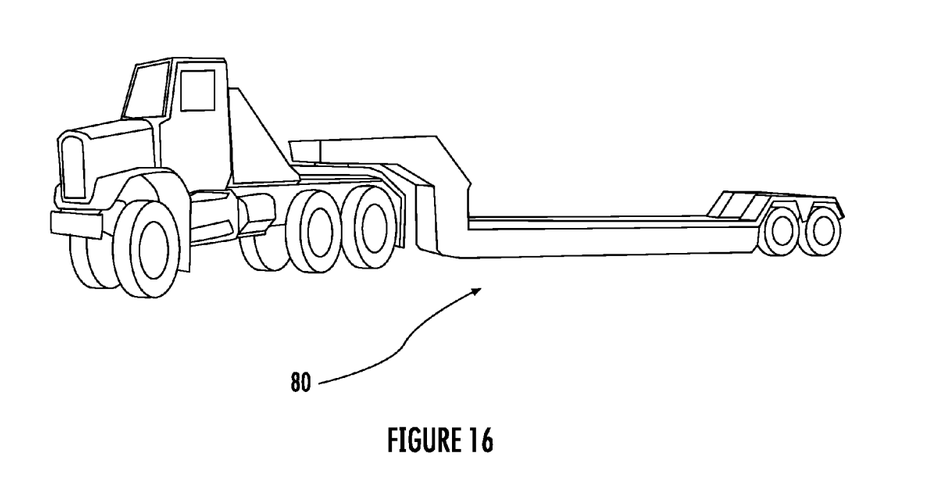
FIG. 16 is a perspective view of a conventional lowboy trailer.

A lowboy trailer is preferred for hauling equipment in excess of 50,000 lbs, or over 10 feet in height. A lowboy trailer also allows heavier equipment to be unloaded more quickly and easily. A lowboy trailer has a lowered center deck between (rather than above) the axles. This in turn requires that the axles be moved further from the center of the trailer, thus making the trailer longer and increasing the turning radius. A conventional lowboy trailer is depicted in FIG. 16.

Smaller equipment (i.e., up to about 50,000 lbs in weight) can usually be hauled on a tag-a-long trailer or a flat trailer on which the deck and the equipment are positioned directly above the trailer axles, thus reducing the overall length of the trailer and allowing for a tighter turning radius.

In remote rural areas (or in any location in which the geometry prevents a lowboy from turning), the inability of the lowboy to reach certain locations makes it difficult or impossible to use at those locations. This in turn requires the use of smaller equipment. In some cases (e.g., lumbering, clearing, power line maintenance), this means items as small as chainsaws must be used manually for work that could be carried out more efficiently (and in some cases more safely) by the type of heavy equipment that requires a lowboy.

In light of the foregoing, there is a need for more effective devices and methods to mobilize heavy equipment on narrow and curving roads, or other confined spaces.

SUMMARY

In one aspect, the invention is a steerable rear assembly for a lowboy trailer that includes a lowboy trailer deck, a neck extending partially upwardly rearward and partially horizontally rearward from the trailer deck, and a front bogey positioned beneath the horizontally extending portion of the neck. The front bogey is connected to the neck by a horizontal pivot between the neck and the front bogey and by a turntable between the neck and the front bogey. A rear bogey is behind the front bogey and is connected to the front bogey by a vertical pivot between the front and rear bogeys.

In another aspect the invention is a steerable rear assembly for a lowboy trailer that includes three cooperating axes of rotation. A first horizontal axis of rotation is between a rear neck that rises behind a lowboy deck and that connects the neck to a first bogey. A first vertical axis of rotation is between the rear neck and the first bogey, and a second vertical axis of rotation is between the first bogey and a second bogey that follows the first bogey.

In yet another aspect, the invention is a method of steering a lowboy trailer over uneven terrain by pivoting a first bogey that is attached to the lowboy trailer about a horizontal axis with respect to the deck of the lowboy trailer while concurrently pivoting the first bogey about a vertical axis with respect to the deck of the lowboy trailer.

The foregoing and other objects and advantages of the invention and the manner in which the same are accomplished will become clearer based on the followed detailed description taken in conjunction with the accompanying drawings.

DETAILED DESCRIPTION

The present invention helps a lowboy trailer reach difficult destinations by providing steering rear axles on a lowboy trailer. The invention effectively reduces the turning radius of the trailer (i.e., with respect to a conventional lowboy trailer with the same length deck). The lowboy deck includes a neck that is positioned higher than, and extending over, the rear axles. The neck is mounted to a turntable on a first ("front") bogey (or "bogie" or "truck"). The turntable is similar to the front of the trailer and a fifth wheel mechanism on a semi-truck. The turntable is mounted to a frame with an axle on one end of the bogey. The turntable enables the front bogey to pivot relative to the neck.

A second bogey follows the first bogey and is attached to the front bogey by a vertical pivot between the bogeys that allows the second bogey to articulate from side to side with respect to the first bogey. Hydraulic cylinders mounted between the bogeys allow the rear of the trailer to be steered and maneuvered around tight curves. The trailer can be operated by remote control or manually by an operator.

Additionally, the turntable on the front bogey includes a horizontal pivot that provides an additional degree of movement for the front bogey with respect to the neck. This helps keep all of the rear wheels on the ground as much as possible on uneven roads or terrain, and thus helps support the load on more than one axle at a time.

The advantage of this design over other types of trailers that have steering ability is the simplicity of the steering mechanism. Other trailers have been built by using more complicated spindle-type mechanisms that are similar to the front axle of a car or truck. Such designs require extra heavy spindles to support the heavy loads and also a more complex system for steering. In addition to simplicity, the cost of the modifications for the present concept is expected to be only about 25% of the cost of a new standard lowboy trailer. Using the invention design, the steering mechanism can be locked in the straight position and used as a conventional lowboy trailer when the rear steering is not required. An emergency brake is included at the rear of the trailer as a safety precaution.

Figure 1:
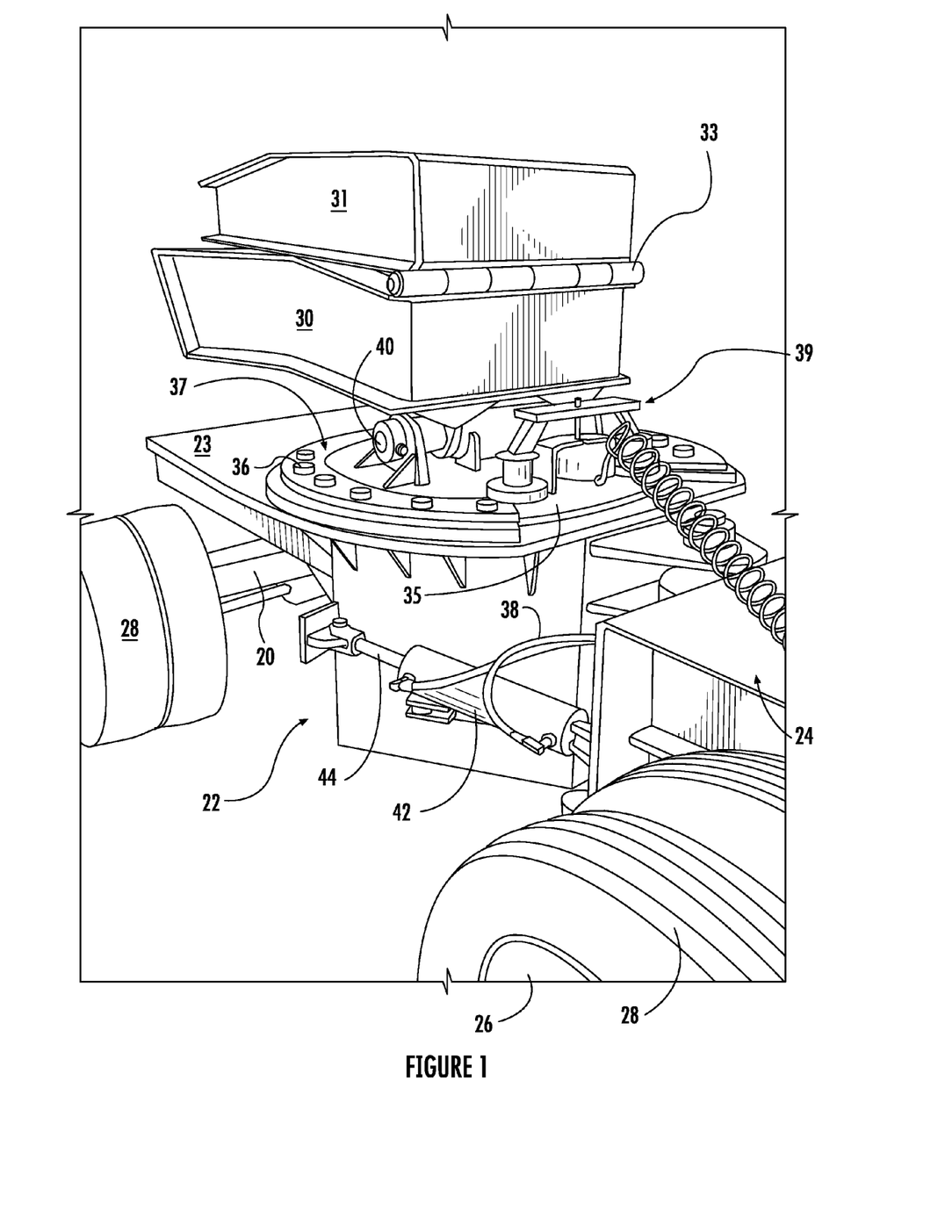
FIG. 1 is a perspective view of portions of the steerable assembly.

FIG. 1 is a view of portions of the invention, including the front bogey 22, the rear bogey 24, and several of the wheels 26 and tires 28. The wheels and tires are supported on respective axles, one of which is illustrated at 20 on the front bogey 22. FIG. 1 also shows the neck 30 extending over the front bogey and the neck extension 31 that is attached to the neck by a hinge 3. FIG. 1 also shows the turntable 35, one of the two turntable restraining plates 37, and the turntable lock 39. A series of bolts 36 fix the retaining plates 37 over the turntable 35, and to the bogey deck 23. FIG. 1 also shows the horizontal pivot 40 that allows the front bogey to move above and below (with respect to) the plane defined by the neck and the remainder of the lowboy trailer. FIG. 1 also shows one of the steering pistons 42 and its arm between the front and rear bogeys. In the illustrated embodiment, the steering cylinder 42 is hydraulically operated through the hydraulic lines 38.

Figure 2:
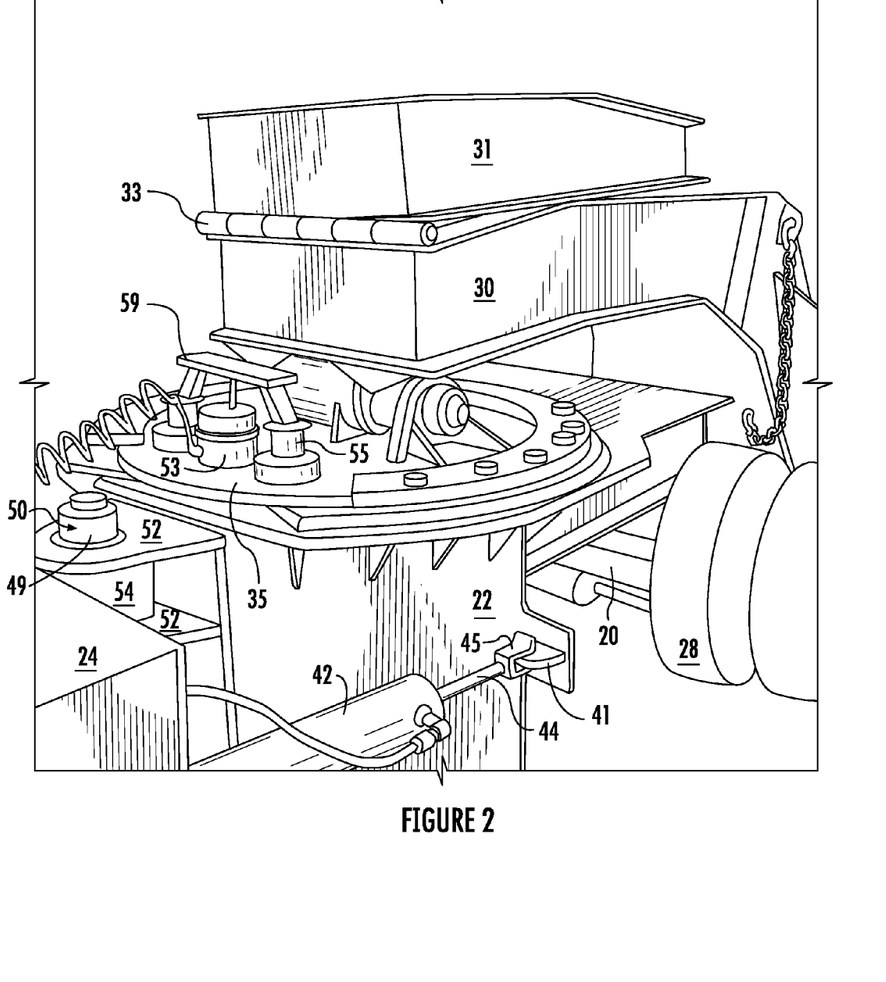
FIG. 2 is a second perspective view from the rear of the steerable assembly.

FIG. 2 shows a number of the same elements. These include the neck extension 31, the neck 30, and the hinge 33 between the neck and the neck extension. The neck extension 31 allows longer equipment to be carried on the deck of the lowboy trailer when desired or necessary.

FIG. 2 also illustrates the horizontal pivot 50 which, in the illustrated embodiment, is a vertical pin (spindle) 49 that rotates within a pair of collar plates 52 attached to the front bogey 22 and a corresponding collar 54 attached to the rear bogey 24. FIG. 2 also illustrates that the steering piston arm 44 has a stirrup 45 that connects to a lip 41 on the front bogey 22.

Figure 3:
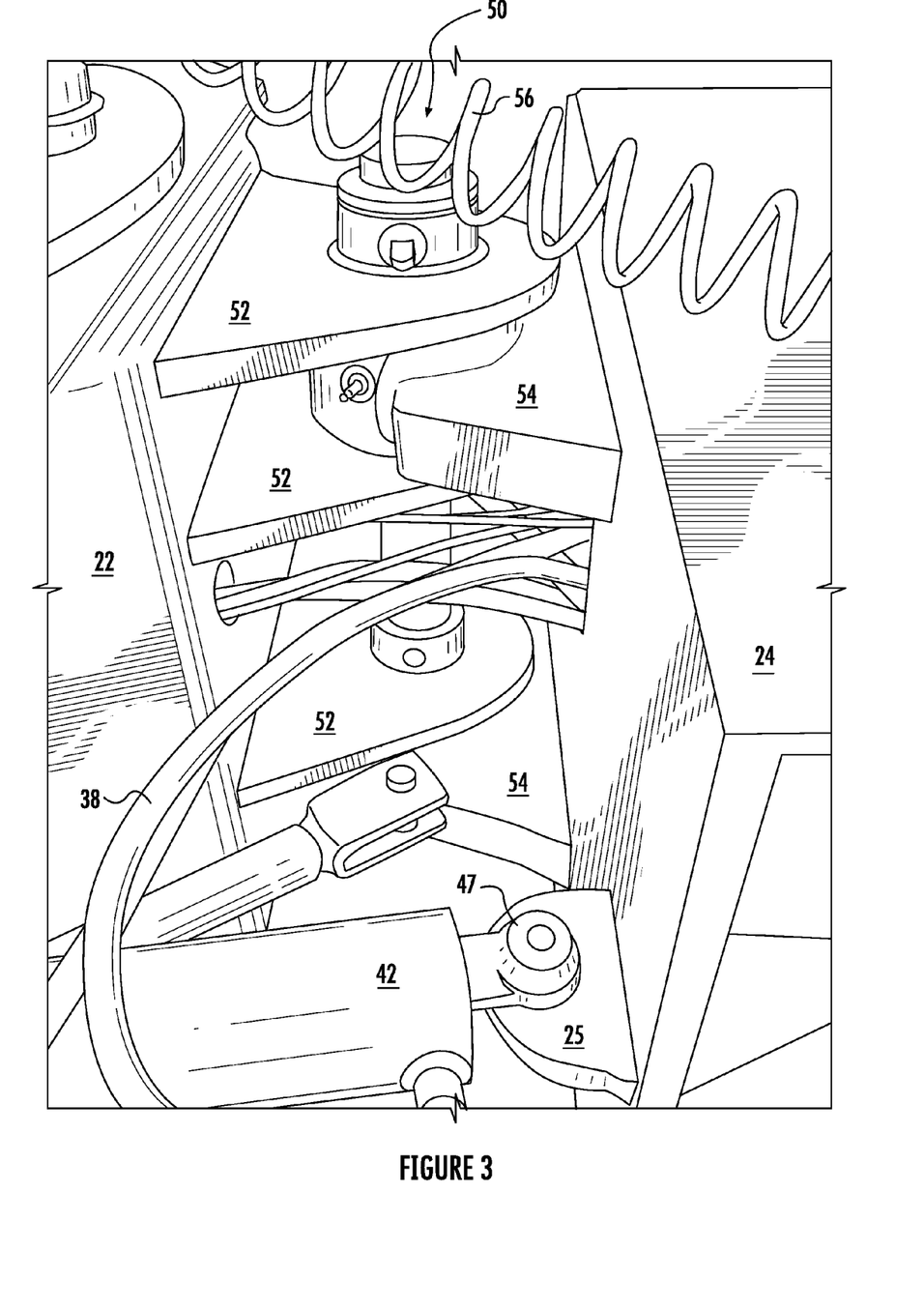
FIGS. 3 and 4 are enlarged views of the pivot point between the front and rear bogeys of the steerable assembly.

FIG. 3 is a close up view of the horizontal pivot 50 between the front and rear bogeys. In FIG. 3 the front bogey 22 is on the left and the rear bogey 24 is on the right. FIG. 3 illustrates the spindle 49, three of the collar plates 52 on the front bogey 22 and the corresponding collars 54 on the rear bogey 24. FIG. 3 also illustrates that the steering piston 42 includes a lug 47 that attaches to a projecting plate 25 on the rear bogey 24. FIG. 3 also illustrates portions of the hydraulic lines 38 and an air line 56 that operates the locking cylinders 55 (FIG. 4)

Figure 4:
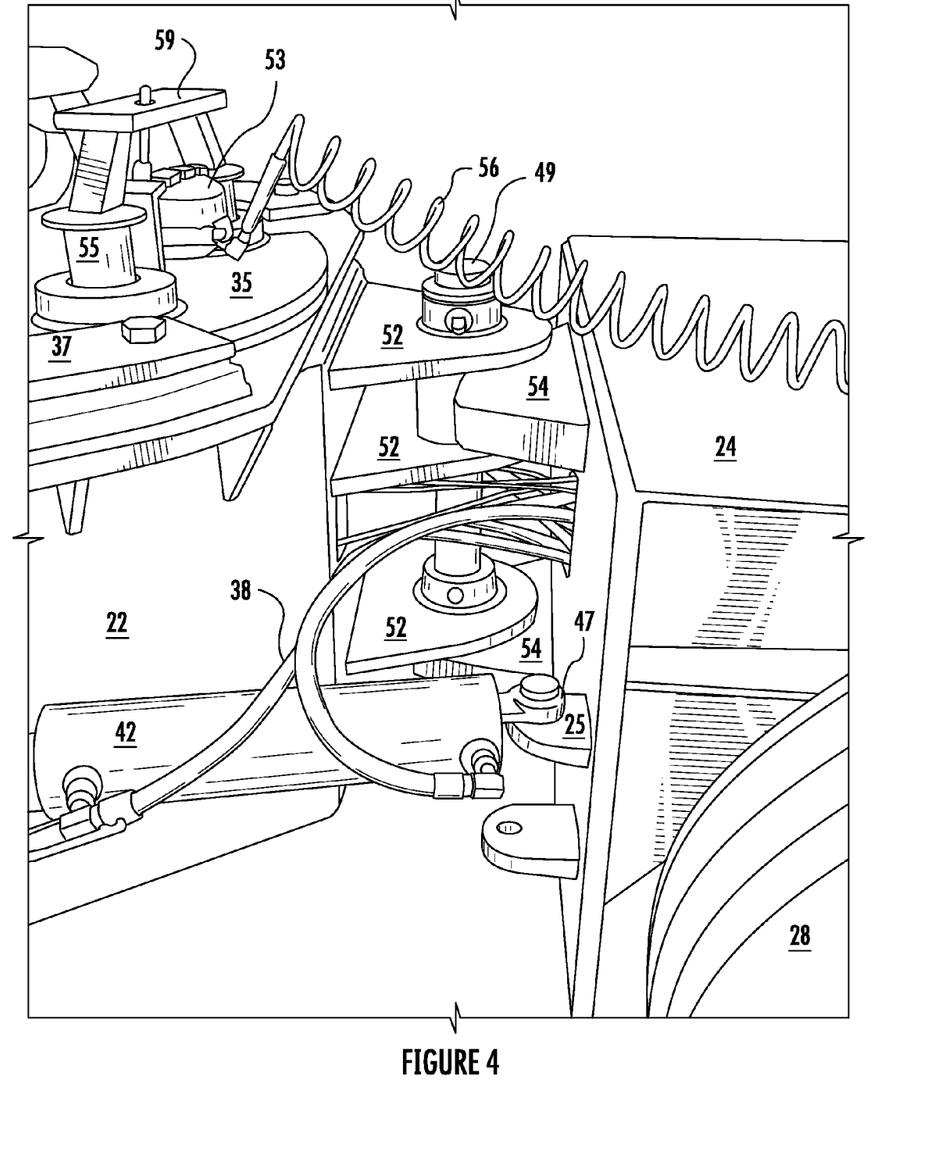

FIG. 4 illustrates a number of the same items as FIG. 3 including the vertical pivot between the front and rear bogies as well as the turntable and the turntable lock. FIG. 4 also shows the steering piston, a small portion of the turntable, and a portion of the turntable restraining plate.

In particular, FIG. 4 more clearly illustrates the air cylinder 53 that raises and lowers the common horizontal support 59 to in turn move the locking cylinders 55 into openings in the turntable 35 to lock the turntable 35 in position.

Figure 5:
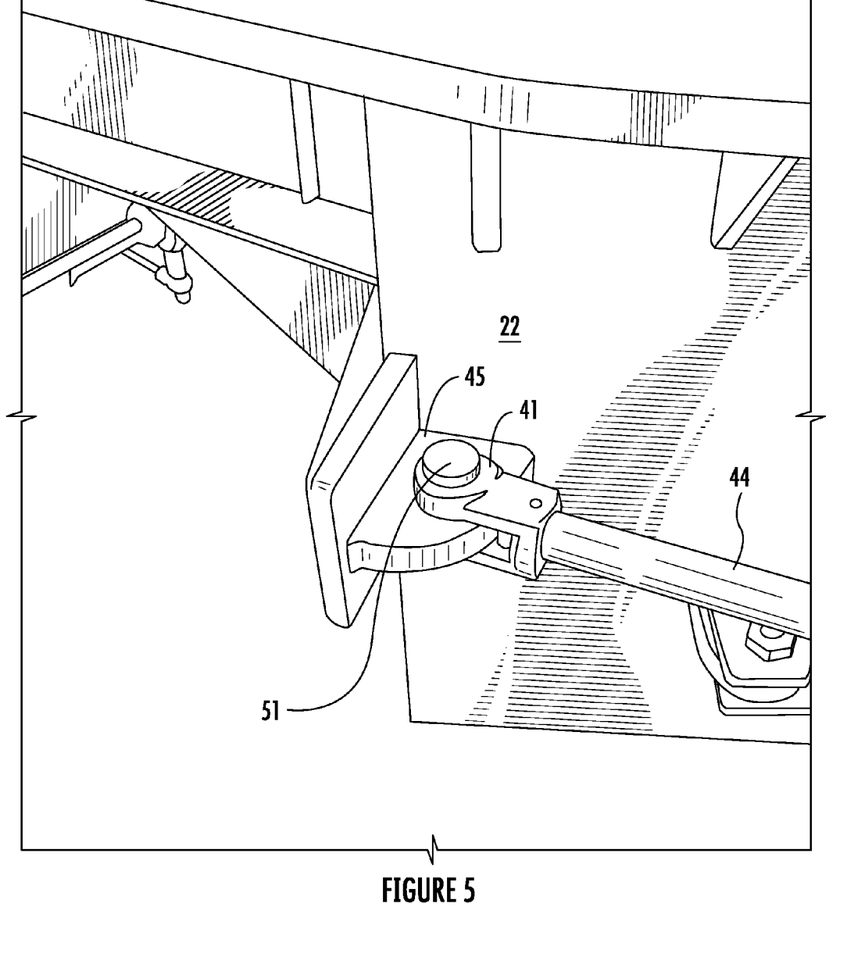
FIG. 5 is an enlarged portion of the front bogey.

FIG. 5 is an enlarged view of the steering piston arm 44 connected at a pivot point 51 to the front bogey 22.

Figure 6:
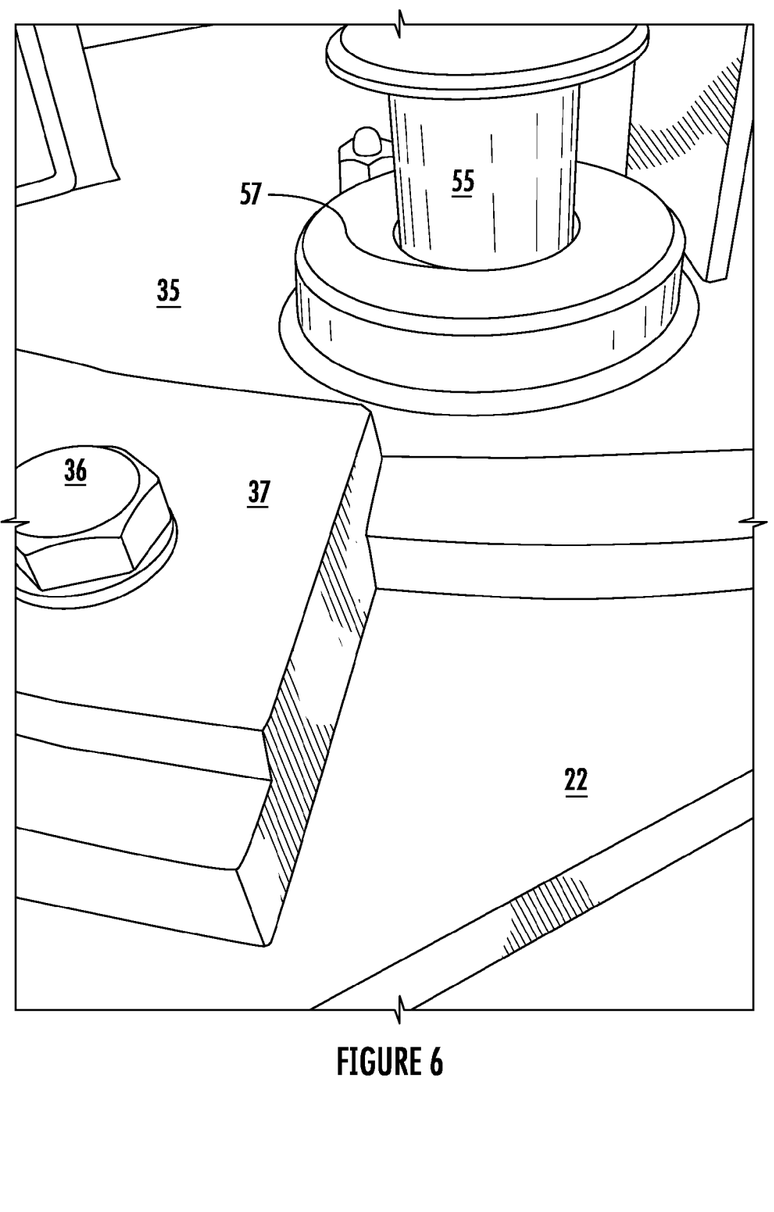
FIG. 6 is another enlarged portion of the front bogey.

FIG. 6 is an enlarged view of portions of the turntable 35, the turntable restraining plate 37, and the turntable lock. The turntable lock is actuated by an air cylinder 53 (FIG. 4) which drives the vertically oriented locking cylinders 55 into corresponding openings 57 in the turntable 35 to prevent the turntable from moving when a fixed relationship is desired or necessary.

Figure 7:
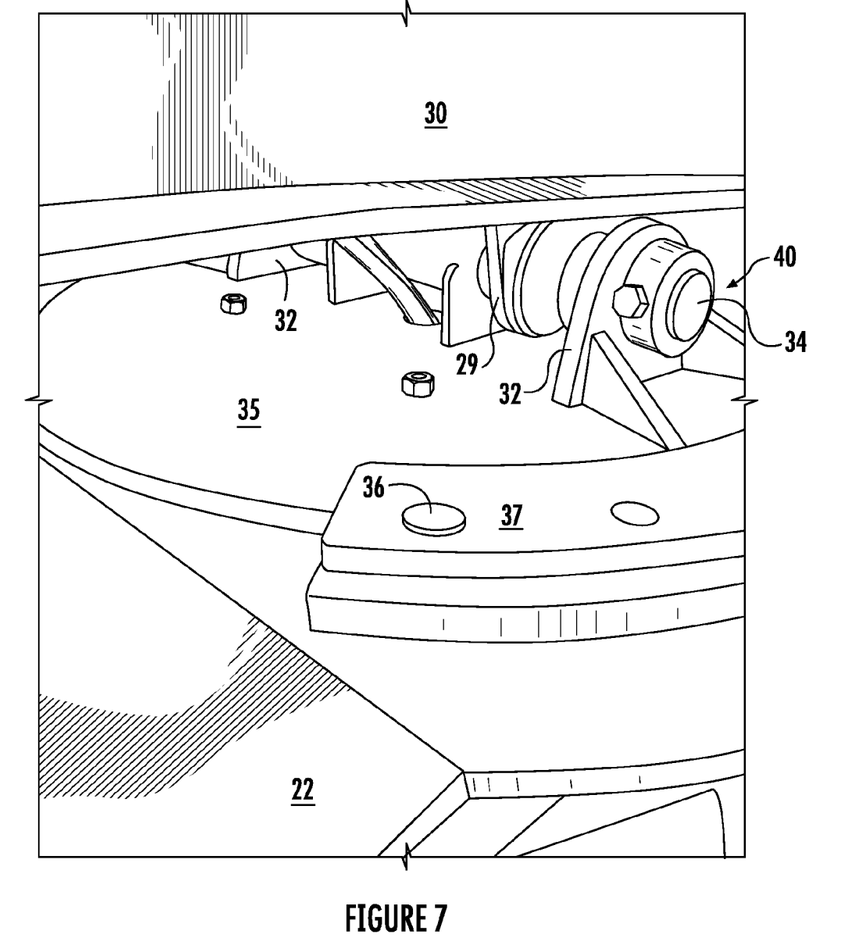
FIG. 7 is an enlarged view of the neck, the turntable, and the horizontal pivot between the neck and the turntable.

FIG. 7 is another enlarged view of the front bogey 22 showing portions of the neck 30, the horizontal pivot between the neck and the front bogey, the turntable, and the turntable restraining plate. In the embodiment illustrated in FIG. 7, the horizontal pivot is broadly designated at 40 and includes a horizontally-oriented spindle 30 that passes through collars 32 attached to the turntable 35 and collars 29 attached to the neck 30.

Figure 8:
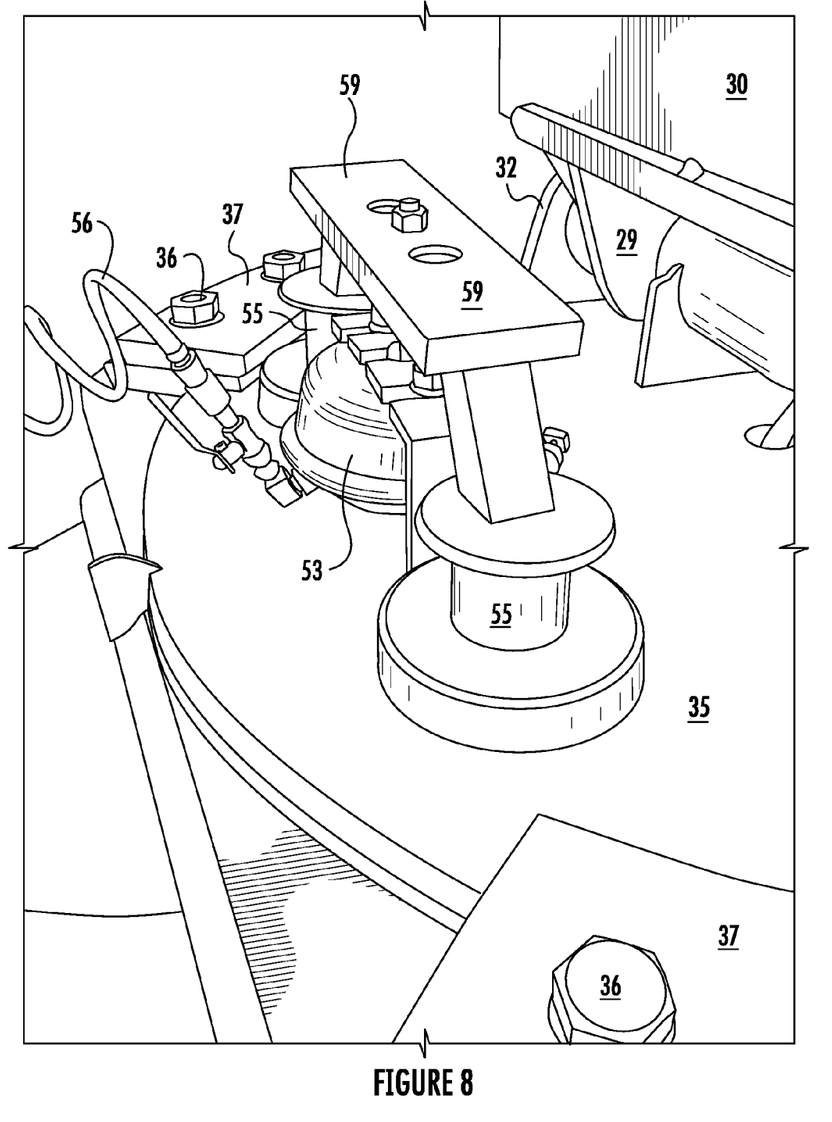
FIG. 8 is an enlarged view of the turntable locking mechanism.

FIG. 8 is an enlarged view of the turntable locking system that again illustrates two vertical locking cylinders 55 attached by a common horizontal supporting arm 59. The air cylinder 53 drives the horizontal supporting arm either upwardly or downwardly and thus locks or unlocks the turntable. Portions of the neck 30, the turntable 35, and the turntable restraining plates 37 are also illustrated in FIG. 8.

Figure 9:
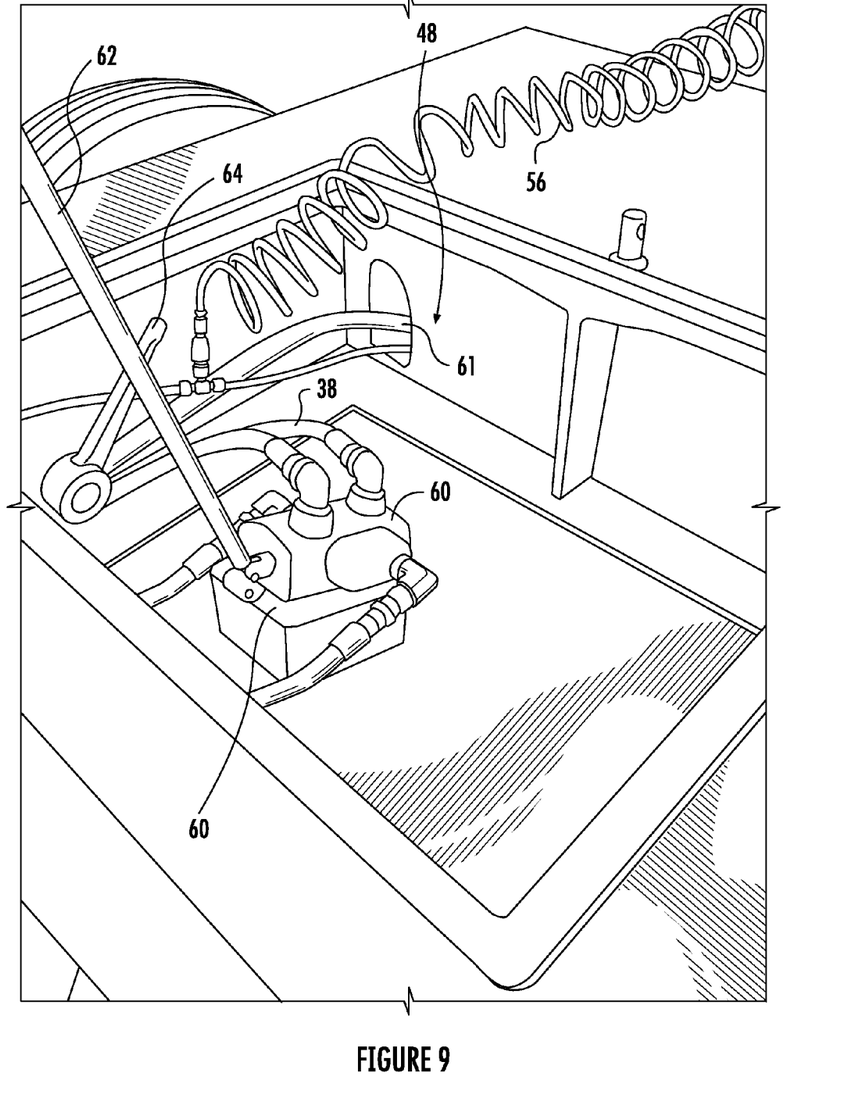
FIG. 9 is a view of the control well in the rear bogey.

FIG. 9 is an enlarged view of the control well 48 in the rear bogey and showing the hydraulic controls 60, a control handle 62, a braking handle 64, a brake line 61, portions of the hydraulic line 38, and portions of the air line 56.

Figure 10:
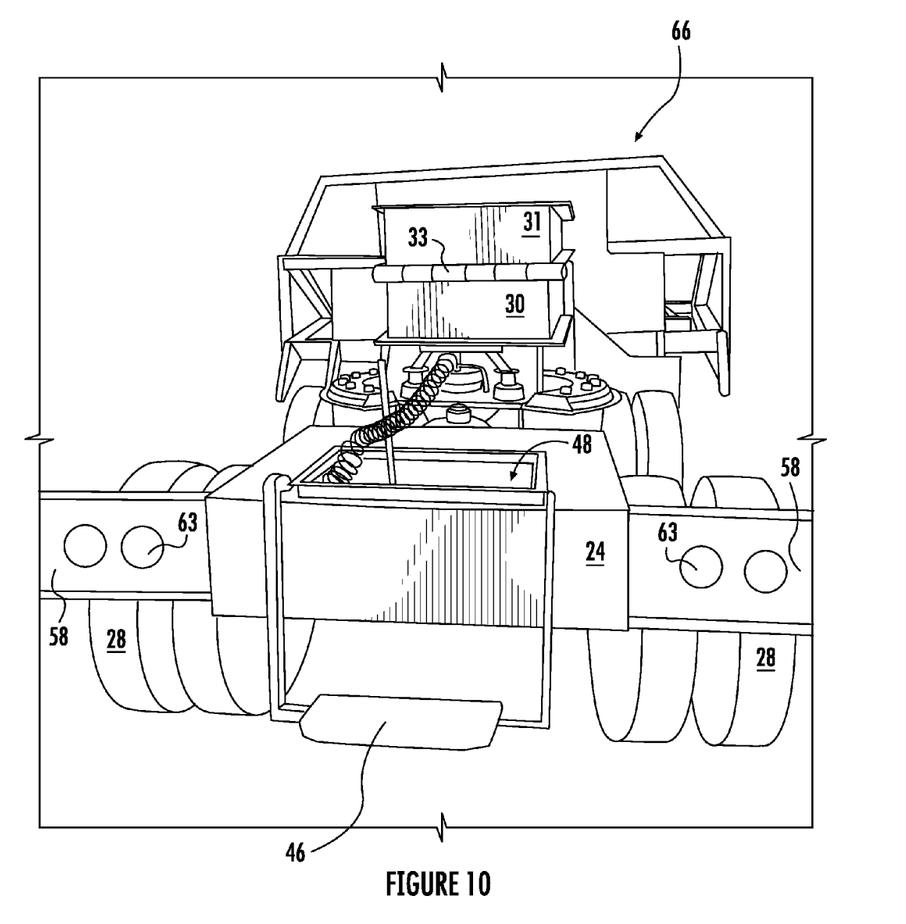
FIG. 10 is a rear perspective view of the entire assembly behind a lowboy trailer.

FIG. 10 is a larger perspective view taking from behind the rear bogey 24. FIG. 10 illustrates portions of the neck 30, the neck extender 31, and the hinge 33, along with the rear bogey 24 and the control well 48. FIG. 10 also illustrates the operator platform 46 behind the control well 48 at the far end of the rear bogey 24. The rear bogey can be operated manually or automatically as may be desired or necessary. For perspective purposes, FIG. 10 illustrates a bulldozer 66 positioned on the deck of the lowboy trailer beyond the front bogey. FIG. 10 also illustrates a rear bumper 58 positioned on either side of the rear bogey 24 with one or more tail lights 63 in the bumper 58.

Figure 11:
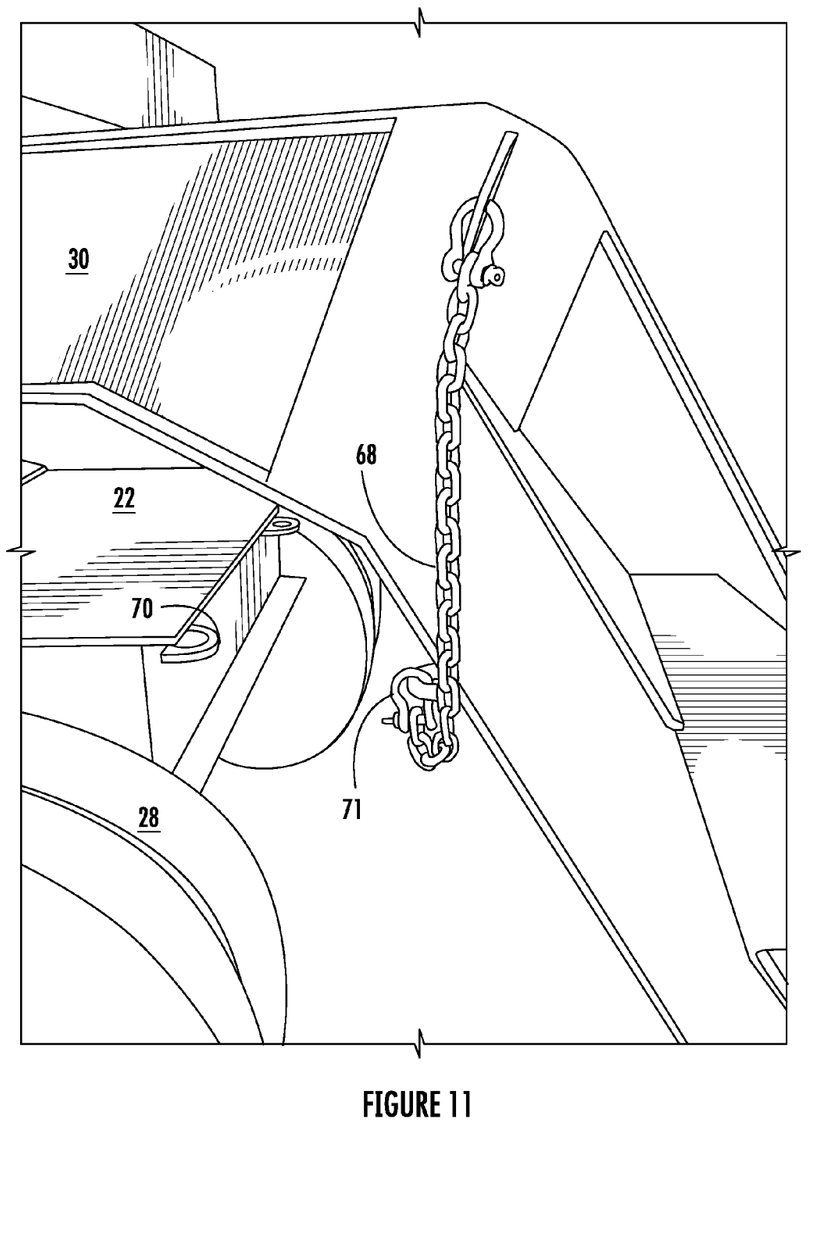
FIG. 11 is an enlarged view of portions of the neck and the front bogey.

FIG. 11 is an enlarged view of portions of the neck 30 and the front bogey 22 that particularly illustrates a safety chain 68 that provides an additional attachment to help secure the neck to the front bogey. Eyelets 70 on the front bogey are positioned to receive the hook 71 on the end of the safety chain.

Figure 12:
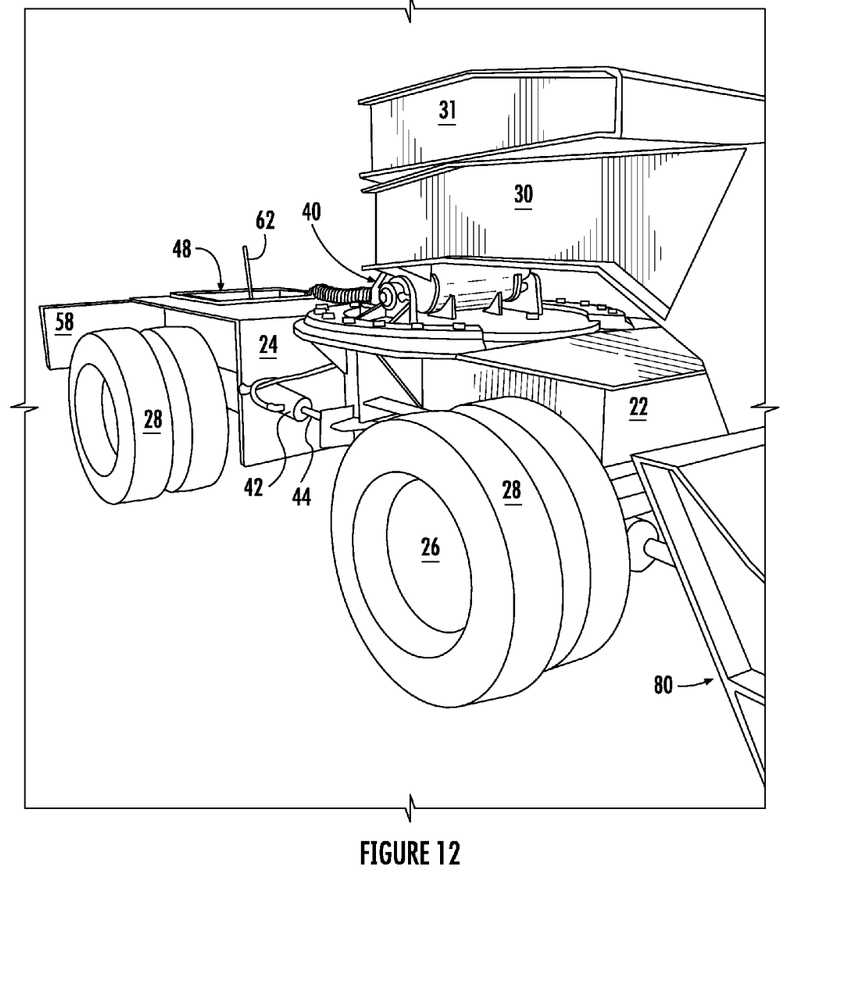
FIG. 12 is a perspective view of both bogeys, the neck, the turntable, the horizontal pivot and a portion of the lowboy trailer.

FIG. 12 is a perspective view of a number of the elements of the invention in combination. FIG. 12 illustrates the front 22 and rear 24 bogeys as well as their wheels 26 and tires 28. The neck 30 and neck extender 31 are both illustrated along with the horizontal pivot 40, and a small portion of the lowboy trailer 80. One of the steering cylinders 42 and its arm 44are likewise illustrated in FIG. 12.

Figure 13:
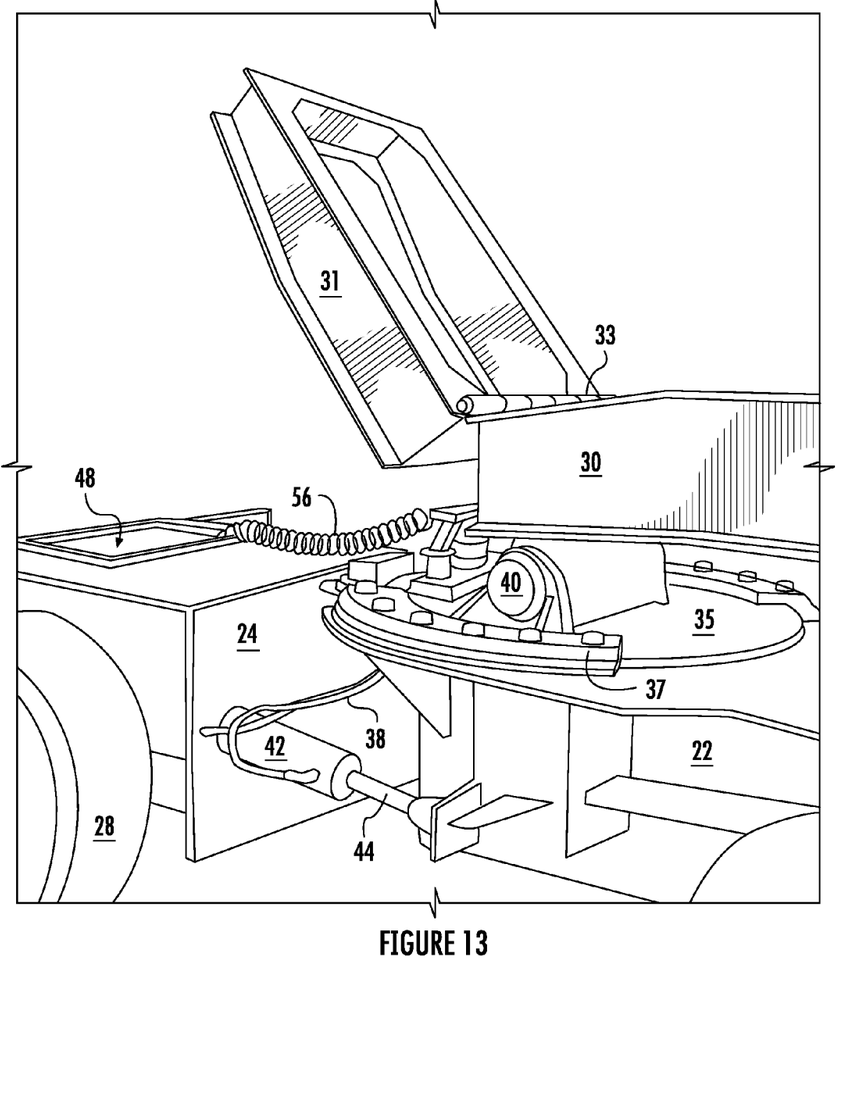
FIG. 13 is a perspective view illustrating the movement of the neck extender.

FIG. 13 is an enlarged view illustrating relative movement of the neck extender 31 and the neck 30 with the hinge 33 in between. For clarity, some of the details in other figures are omitted here. FIG. 13 also illustrates the horizontal pivot 40, the turntable 35, the turntable restraining plate 37, the steering piston 42, and the arm 44 of the steering piston.

Figure 14:
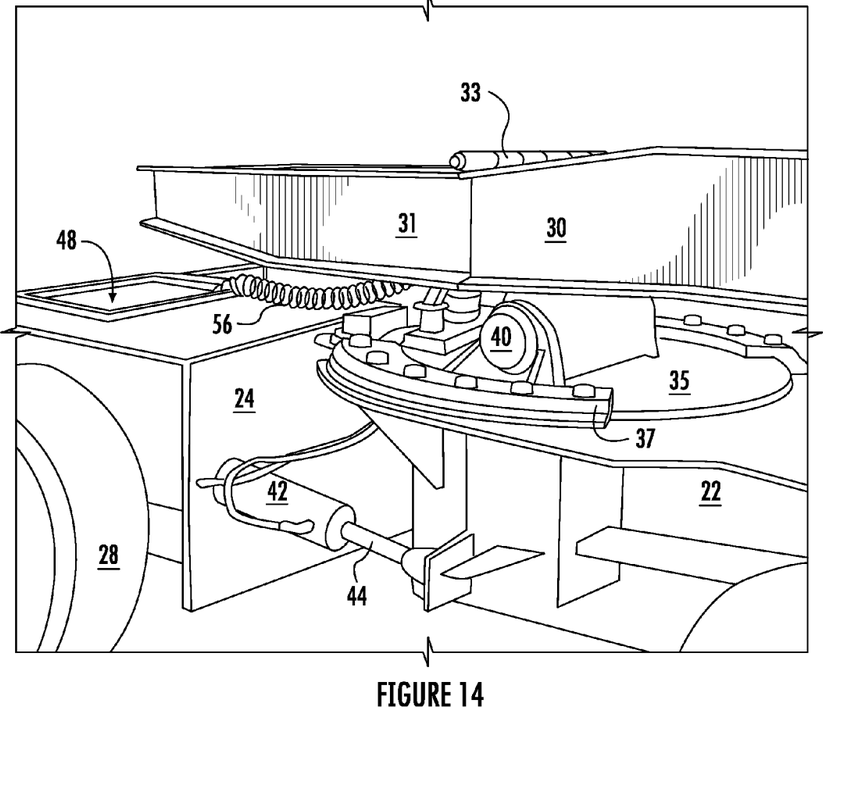
FIG. 14 is a view similar to FIG. 13 illustrating the neck extender in a fully extended position.

FIG. 14 is a view substantially the same as FIG. 13, but showing the neck extender 31 in its fully extended position over the rear bogey 24. The other elements of FIG. 14 are the same as in FIG. 13.

Figure 15:
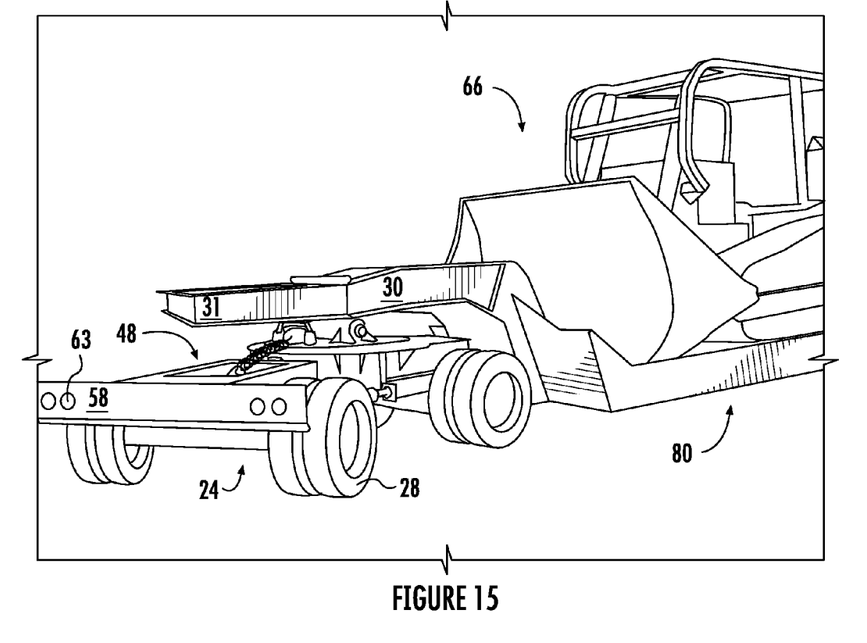
FIG. 15 is a perspective environmental view of the assembly and in connection with a low boy trailer and its load.

FIG. 15 illustrates the lowboy trailer and the steerable portion of the invention in an environmental context. FIG. 15 illustrates a bulldozer 66 on the deck of the lowboy trailer80, the neck30, and the neck extender 31 outstretched rearward from the lowboy deck over the front and rear bogeys. The front bogey 22 is pivoted somewhat with respect to the neck 30 using the turntable 35. The rear bogey 24 is likewise pivoted with respect to both the neck 30 and the front bogey 22 based upon the vertical pivot 50 and the steering cylinders (which are not visible in the view of FIG. 15).

FIG. 16 is a perspective view of a conventional lowboy trailer 80.

The steerable rear assembly of the invention can alternatively be expressed by the three cooperating axes of rotation that the assembly defines. A first horizontal axis of rotation is between the rear neck 30 that rises behind the lowboy trailer 80 and that connects the neck 30 to the front (or first) bogey 22. In the illustrated embodiment this axis is the horizontal pivot 40.

A first vertical axis of rotation is located between the rear neck 30 and the first bogey 22 and in the illustrated embodiment is defined by the turntable 35 and its rotational movement with respect to both the neck 30 and the front bogey 22.

A second vertical axis of rotation is located between the first (front) bogey 22 and the second (rear) bogey 24 that follows the first bogey. In the illustrated embodiment, the second vertical axis of rotation is the vertical pivot 50 that includes the spindle 49.

As set forth elsewhere herein, a lowboy trailer is defined by the position of its deck positioned below a plane defined by the tops of the wheels and tires of said lowboy trailer, and in some cases by its position along a plane defined by the axles of said lowboy trailer. On the open highway, and for purposes of loading and unloading, the lowest possible deck is most advantageous, but on uneven roads or terrain a somewhat higher deck will generally be more advantageous.

In the illustrated embodiments the first vertical axis of rotation intersects the first horizontal axis of rotation, and does so perpendicularly; i.e. the horizontal pivot 40 is centered over the center of the turntable 35. The first and second vertical axes of rotation lie along a line parallel to the longitudinal direction of said lowboy trailer, and in particular lie along a line that longitudinally bisects the lowboy trailer.

The nature of the cooperating axes of rotation also provides a method of steering a lowboy trailer over uneven terrain by pivoting a first bogey that is attached to the lowboy trailer about a horizontal axis with respect to the deck of the lowboy trailer while concurrently pivoting the first bogey about a vertical axis with respect to the deck of the lowboy trailer. In this aspect, the method can further comprise pivoting a second bogey that is attached behind said first bogey about a vertical axis between the first and second bogeys.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A steerable rear assembly for a lowboy trailer comprising:
    a lowboy trailer deck;
    a neck extending partially upwardly rearward and partially horizontally rearward from said lowboy trailer deck;
    said neck further comprises a hinged neck extension that can rotate on said hinge between a folded position above said neck and an extended position beyond said neck;
    a front bogey positioned behind said lowboy trailer deck beneath the horizontally extending rearward portion of said neck; said front bogey being connected to said neck by a horizontal pivot between said neck and said front bogey and by a turntable between said neck and said front bogey;
    an axle on one end of said front bogey; and
    a rear bogey behind said front bogey and connected to said front bogey by a vertical pivot between said front and rear bogeys; and
    at least one steering piston connected to said front bogey and said rear bogey for steering said rear bogey with respect to set front Bogey about said vertical pivot.

2. A steerable rear assembly according to claim 1 wherein said rear bogey comprises one horizontal axle with a corresponding set of wheels and tires on said horizontal axle.

3. A steerable rear assembly according to claim 1 wherein said lowboy trailer deck is lower than the height of the top of any of the wheels.

4. A steerable rear assembly according to claim 1 wherein said lowboy trailer deck is lower than the position of any of the axles.

5. A steerable rear assembly according to claim 1 wherein said horizontal pivot is on said turntable.

6. A steerable rear assembly according to claim 1 comprising two of said steering pistons with one piston on each respective side of said vertical pivot.

7. A steerable rear assembly according to claim 1 and further comprising a turntable lock that when engaged precludes said front bogey from pivoting with respect to said neck.

8. A steerable rear assembly according to claim 7 wherein said turntable lock comprises at least one reciprocating locking cylinder above said turntable and at least one corresponding opening in said turntable for receiving said cylinder to thereby lock said turntable.

* * * * *

UNITED STATES PATENT AND TRADEMARK OFFICE
CERTIFICATE OF CORRECTION

Page 1 of 1

| | |
|---|---|
| PATENT NO. | : 9,150,248 B2 |
| APPLICATION NO. | : 13/705626 |
| DATED | : October 6, 2015 |
| INVENTOR(S) | : Jesse L. Crisp and John K. Crisp |

It is certified that error appears in the above-identified patent and that said Letters Patent is hereby corrected as shown below:

Under CLAIMS, Column 6, Line 21:

Delete:
"respect to set front Bogey about said vertical pivot."

and INSERT:
--respect to said front bogey about said vertical pivot.--

Signed and Sealed this
Twenty-fourth Day of May, 2016

Michelle K. Lee
*Director of the United States Patent and Trademark Office*